Figure 1:
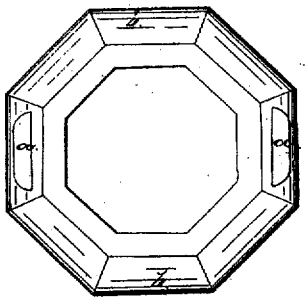
Figure 2:
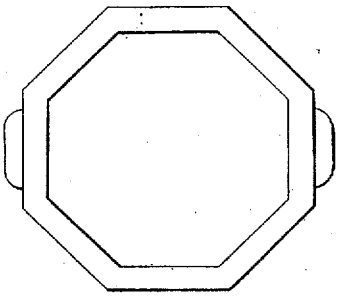
Figure 3:
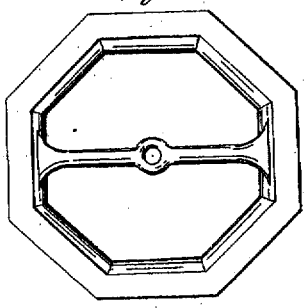
Figure 6:
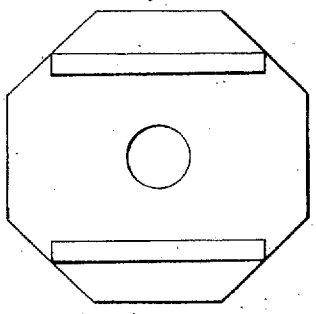
Figure 7:
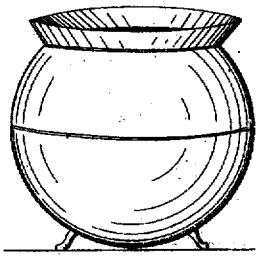
Figure 4:
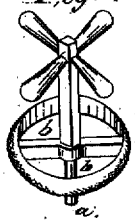

9362X

L. H. Maus,

Casting Hollow-ware.

Patented Feb. 5, 1836.

Witnesses:
Lyman Sholes

Inventor:
Louis H. Maus

1

9362X Feb 5, 1836

Lewis M. Maus. Danville Pennsylvania

Letters Patent

The Schedule referred to in these Letters Patent and making part of the same
containing a description in the words of the said Lewis M. Maus himself
of his improvement in making patterns and flasks for casting iron ware.

To all to whom these Presents shall come. Be it known that I
Lewis M. Maus of Danville in the County of Columbia and State
of Pennsylvania have invented a new and useful mode and plan
in making and forming flasks & patterns and moulding iron hollow bulge ware
such as kitchen pots, [illegible] Sauce pans. Tea kettles. and all other kinds of iron
hollow ware, which requires the mouth to be smaller than the body, or with
a rim or flange to the mouth and that the following is a full and exact
description thereof. — Specifications —
Whereas a great loss has been sustained by those engaged in the making
of iron hollow bulge ware arising from the manner of moulding the same
with patterns cut through vertically, and the use of flasks cut in the same
way with iron cheeks. To obviate this difficulty and loss, I have in
vented the following. 1st The flask to be made of either (wood or iron
without iron cheeks, cut horizontally in two places so as to make three
distinct pieces with (handles in the cope and middle piece) the drag
to be made with a bar across it and a hole in the middle of the bar
to receive the end of the anchor. the cope middle piece and drag
of the flask to be joined by (Dowels and fastened with hooks & eyes)
2nd an anchor made of iron with a ring near the one end & four
openings in the said ring for the purpose of pulling the sand through
to form the core. this anchor to lift the core with when formed.
3d But one pattern is required to form both the inside and outside
of the ware to be cast. the pattern to be cut in two places. the widest
& narrowest places so as to form three distinct pieces when pots or bulge
ware with a rim or flange are to be moulded. but if ware without a

2

9362X

Feb 5, 1836 rim or flanges such as tea kettles glue pots are to be moulded then the
pattern is only to be cut in the widest place. In moulding with this
improvement I place the piece of the pattern for the forming the bottom
of the pot or kettle on a board or iron plate outside or bottom upward
and place the cope and flask over the bottom piece of the pattern.
The [illegible] for [illegible] and the gate to pour the metal through to be fixed in the
usual way. I then fill & ram that part of the flask full of sand
I then place a board or iron plate on the flask and turn its upper side
down. I then remove the first board or iron plate & put on the surface of
the sand turned up some dry sand called parting sand. then I put
on the middle piece of the pattern and if moulding a tea kettle or pot
without a rim or flange. I fill up the outside with sand after putting
on the middle piece of the flask but if moulding a pot with a rim or
flange. that part of the pattern which forms the rim or flange is
to be put on at the same time the second or middle piece of the pat-
tern is put on and rammed up with sand on the outside of the pattern
I then place the anchor in the bar of the drag or last piece of the flask
and put a key in the foot of the anchor and put it to its place inside of
the pattern. I then ram up the core with sand through the opening in
the ring of the anchor until it is filled even with the upper surface of the
ring then put on dry or parting sand. I then fill and ram up the drag
full of sand and take out the key which fastens the foot of the foot of the
anchor in the bar of the drag. I then lay on the bottom board or iron
plate and turn the flask upside down on this board or iron plate.
which has a vent hole in the centre. I then lift off the cope of the
flask first and the bottom part or piece of the pattern and insert a
[illegible] into the hole in the square end of the anchor and lift out the
core which I place for security in a stand or plank with a hole to
receive the lower end of the anchor. I then lift out the second or mid-
dle piece of the pattern. and take off the middle piece of the flask. I then
lift off the part of the pattern which forms the rim or flange if I am
moulding a pot. I then replace the middle piece of the flask when
the core. then replace the cope or last piece of the flask [illegible]

3

9362x

Feb 5, 1836

[illegible] the pots [illegible] when the whole is ready for casting or [illegible] the [illegible]
al. By my improvement and plan I save labour and expense in
preparing patterns. one pattern being only required whereas the plan
now used requires two patterns one to form the outside and one the inside
of the vessel to be cast. My plan also simplifies the moulding. a boy of
sixteen years of age of common capacity will learn to mould on my plan
in a week from his first making the attempt. whereas with the old plan
it requires men of experience to whom high wages are paid. My plan
is more certain to cast perfect ware. the core not being liable to be displac
ed as frequently happens with the present method. I also gain by ma
king a better quality of ware of less weight out of the same kind of metal
than can be made on the old plan. according to the plan now used for makin
pots the iron chills of the flask comes in contact with the sides of the pots
or kettles and hardens the metal which requires the ware to be made heavy
and thick to prevent its breaking and even with this precaution it
frequently breaks with the most careful handling causing great loss and
disappointment. my plan having no chills, no such effect is produced
every part of the ware is of the same temper & much lighter without danger
of breaking by handling. ware made in the old way has a vertical edge
or fin in each side caused by the iron chucks of the flask. my plan make
the sides of the ware perfectly smooth and free from all edges or fins Witnesses
David Petrikin
A S Petrikin Danville Columbia County Pennsylvania
November 26th 1835
Lewis H. Mills Ex.
[illegible]

10 69 words

Drawing